US012773869B2

(12) United States Patent
Iordanou et al.

(10) Patent No.: US 12,773,869 B2
(45) Date of Patent: Oct. 27, 2026

(54) SINGLE ADJUSTABLE ALBUM-STORAGE UNIT-PELMET-PHOTO FRAME

(71) Applicants: Kosmas Iordanou, Athens (GR); Messinia Kalogeropoulou, Athens (GR)

(72) Inventors: Kosmas Iordanou, Athens (GR); Messinia Kalogeropoulou, Athens (GR)

( * ) Notice: Subject to any disclaimer, the term of this patent is extended or adjusted under 35 U.S.C. 154(b) by 139 days.

(21) Appl. No.: 18/706,440

(22) PCT Filed: Oct. 27, 2022

(86) PCT No.: PCT/GR2022/000059
§ 371 (c)(1),
(2) Date: May 1, 2024

(87) PCT Pub. No.: WO2023/073386
PCT Pub. Date: May 4, 2023

(65) Prior Publication Data

US 2026/0048606 A1 Feb. 19, 2026

(30) Foreign Application Priority Data

Nov. 1, 2021 (GR) ............................. 20210100762

(51) Int. Cl.
*B42D 1/08* (2006.01)
*A47F 7/14* (2006.01)
*A47G 1/06* (2006.01)

(52) U.S. Cl.
CPC ................ *B42D 1/08* (2013.01); *A47F 7/146* (2013.01); *A47G 1/065* (2013.01)

(58) Field of Classification Search
CPC ............ B42D 1/08; A47F 7/146; A47G 1/065
See application file for complete search history.

(56) References Cited

U.S. PATENT DOCUMENTS 2,985,333 A * 5/1961 Kirkman ................ A47B 88/90 220/533
5,096,056 A * 3/1992 Garcia ................... A45C 13/02 206/455
5,769,244 A * 6/1998 Wyatt ................ G11B 33/0483 211/41.12
(Continued)

FOREIGN PATENT DOCUMENTS

JP 09058149 A * 3/1997

*Primary Examiner* — Gary C Hoge

(57) ABSTRACT

A polymorphic box functions simultaneously as a printed or digital album, a picture frame, and a frame, with storage space with a perimeter engraving for the support of vertical and horizontal formed slats that have a special engraving for easy cutting at a point where the slats cross each other. The polymorphic box also has a transparent drawer frame which is a lid of the storage space and a base of the album. An external screw frame assisted by loops of variable position support the polymorphic box vertically or horizontally, depending on the geometry of the image or text it depicts, so that the box functions as a frame. A special engraving of the external screw frame adjusts degrees of inclination of the photo frame vertically or horizontally. The special engraving of the vertical and horizontal slats, allowing various cuts, adjusts dimensions of the storage space.

5 Claims, 10 Drawing Sheets

(56) References Cited

U.S. PATENT DOCUMENTS

| | | | | |
|---|---|---|---|---|
| 6,845,582 | B1 * | 1/2005 | Ho | A47G 1/06 40/721 |
| 2006/0038394 | A1 * | 2/2006 | Henley | B42D 1/08 281/21.1 |
| 2009/0085343 | A1 * | 4/2009 | Burch, V | B42D 15/00 283/67 |
| 2009/0242455 | A1 * | 10/2009 | Adams | B65D 5/68 206/575 |
| 2013/0081313 | A1 * | 4/2013 | Hornbeek | A47G 1/065 40/721 |
| 2014/0059902 | A1 * | 3/2014 | Brown | A47G 1/065 40/497 |
| 2014/0175101 | A1 * | 6/2014 | Dixon | B65B 5/06 53/445 |
| 2014/0361524 | A1 * | 12/2014 | Frison | B42D 1/06 281/21.1 |
| 2017/0239122 | A1 * | 8/2017 | McLaughlin | A61G 17/08 |

* cited by examiner

SINGLE ADJUSTABLE ALBUM-STORAGE UNIT-PELMET-PHOTO FRAME

TECHNICAL FIELD

The present invention refers to a polymorphic box that functions simultaneously as a) a printed or digital album b) a picture frame and c) a frame with storage space for storing souvenirs.

STATE OF THE ART

To date, no similar polymorphic box is known. The existing boxes cover up to two of the functional properties of the present invention, while only one of them has the ability to be adjusted according to the needs of the user. In existing boxes, dimensions and functions are standardized having no adjustment flexibility. In addition, its structure is made in such a way that it can be easily assembled and adapt its functions to the needs of each user.

Therefore, the present invention was created, in order to give the user, the ability to use a box that will be flexible in its adjustments while it simultaneously has all the above-mentioned functional properties.

BRIEF DESCRIPTION OF THE FIGURES

The above features and other advantages of the present invention will be better understood from the following detailed description taken in conjunction with the accompanying drawings.

DISCLOSURE OF INVENTION

In order to make the invention comprehensible to those skilled in the art, reference to the submitted figures is made.

Figure 6:
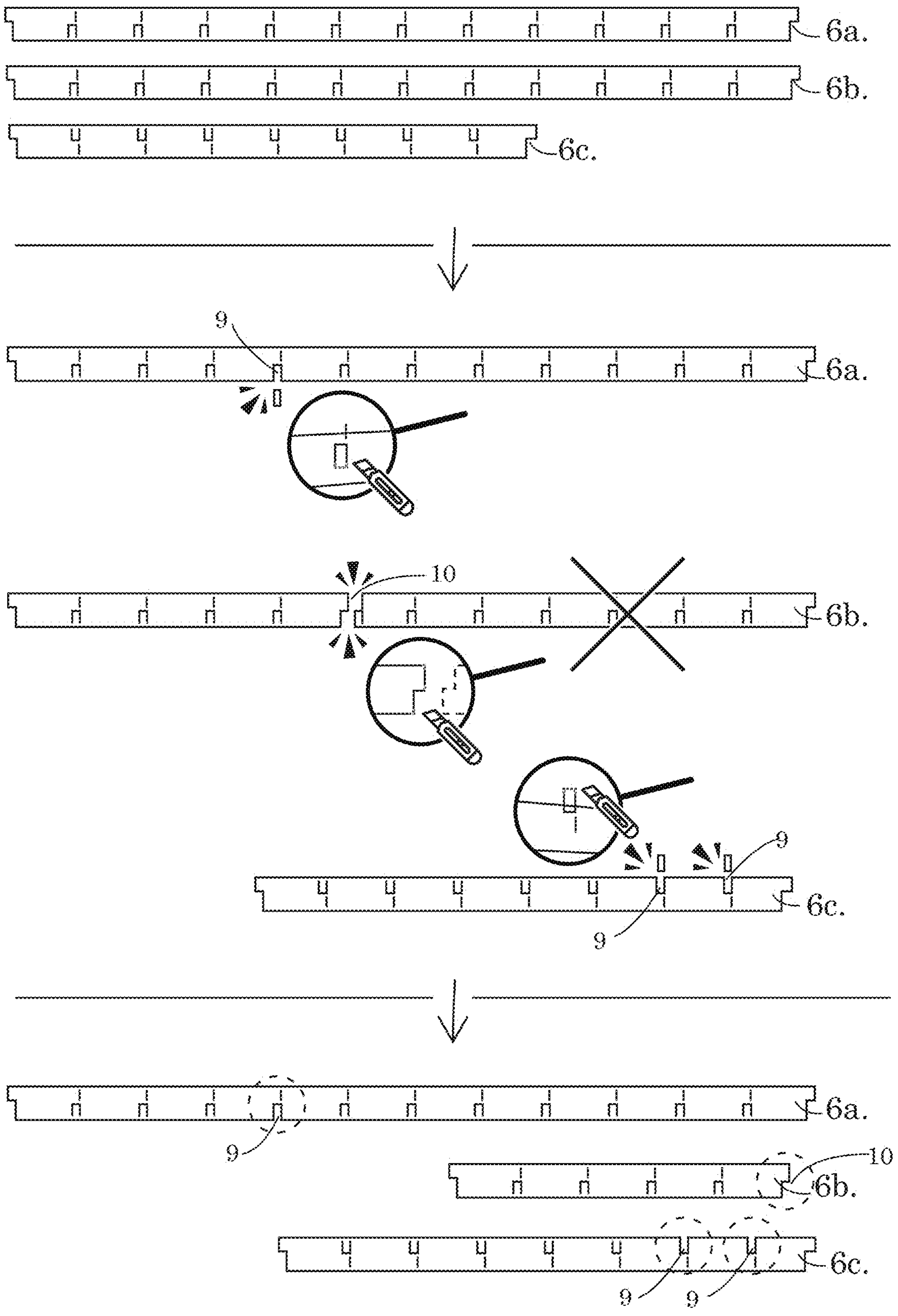
FIG. 6 presents the vertical and horizontal dividing slats and the stages of their relative machining to space the area as it serves us.
Figure 7:
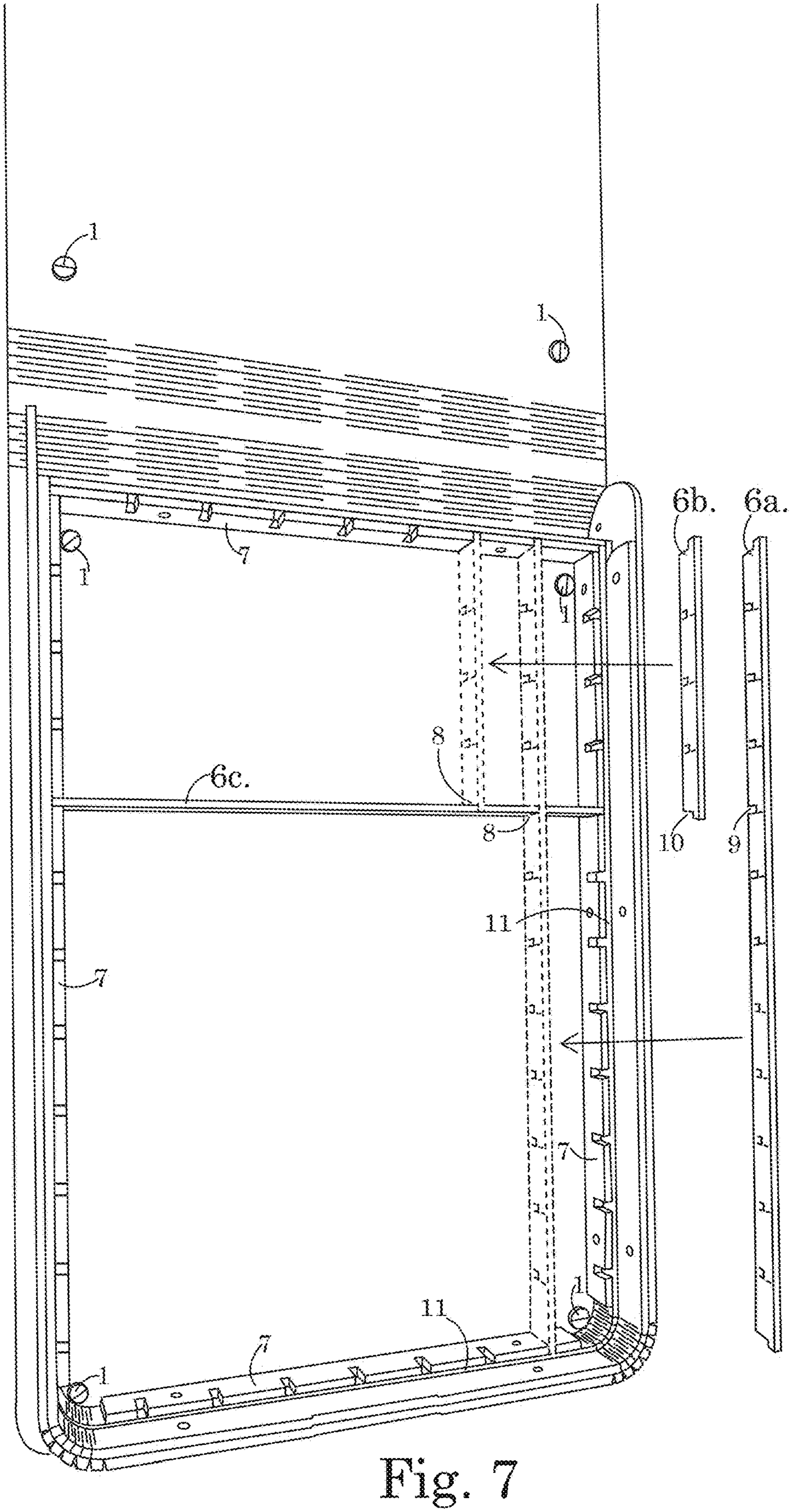
FIG. 7 shows the rendering of the storage space with the addition of the partitions we machined.
Figure 8:
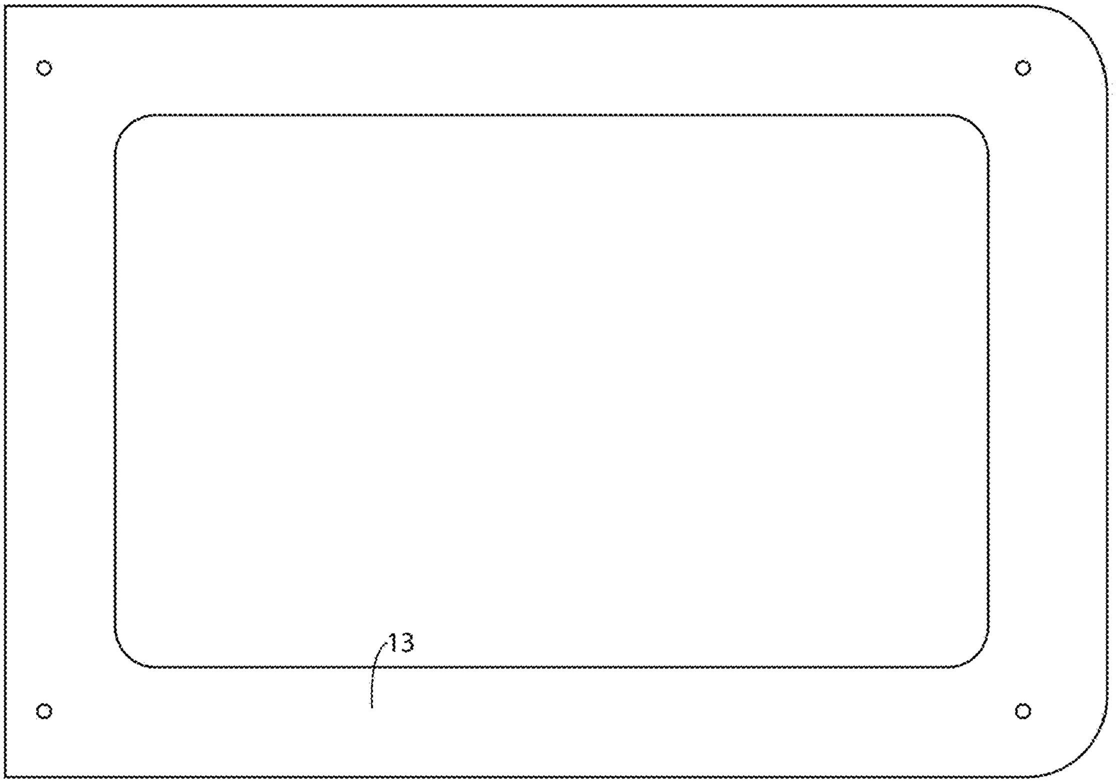
FIG. 8 shows the support frame for the front cover photo.

The singular element of the polymorphic box is that it has storage space alongside and independently of the album, the picture frame and the pelmet. But the biggest innovation is that this space can be separated with specially designed slats/dividers (6_a_,6_b_,6_c_), FIG. 6, depending on the dimensions of the objects we want to store. In particular, the storage space is run by perimeter slats (7) with a special evenly spaced engraving which is a guide for placing vertical (6_c_) and horizontal dividers (6_a_,6_b_). The vertical (6_c_) and horizontal dividers (6_a_,6_b_) are connected and form cross sections (8) at a 90° angle, FIG. 7, so as to delimit the space to the dimensions that serve us each time. The dividers (6_a_, 6_b_, 6_c_) are engraved so the user can easily cut them partly and create a groove (9) where they intersect, or cut them entirely (10) if they don't want them to run the entire distance of the inside perimeter of the storage space. During the planning and adaptation of the delimited storage space, the slats (6_a_,6_b_,6_c_) can be disassembled and reassembled creating different partitions. The storage spaces that exist on the market contain partitions with no ability of adjustment, with the consequence that they are of limited functionality as they store objects of standard dimensions.

Figure 1:
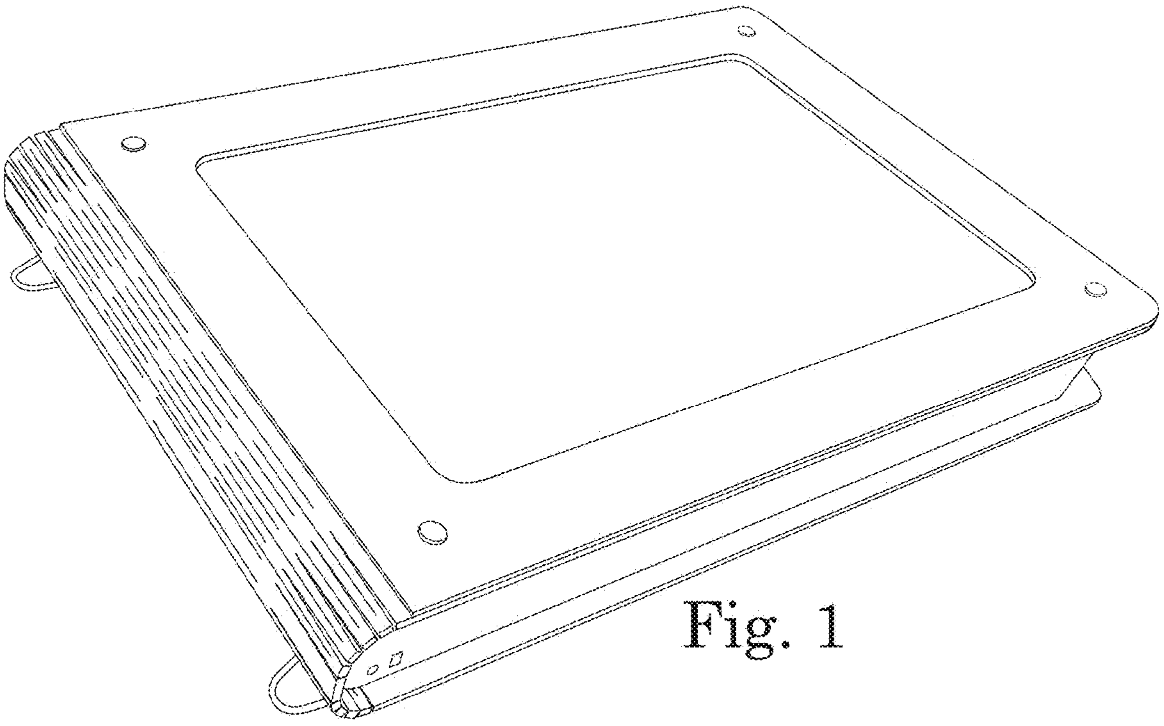
FIG. 1 shows a perspective view of an album according to a main embodiment of the present invention, showing the front exterior appearance of the closed album.
Figure 2:
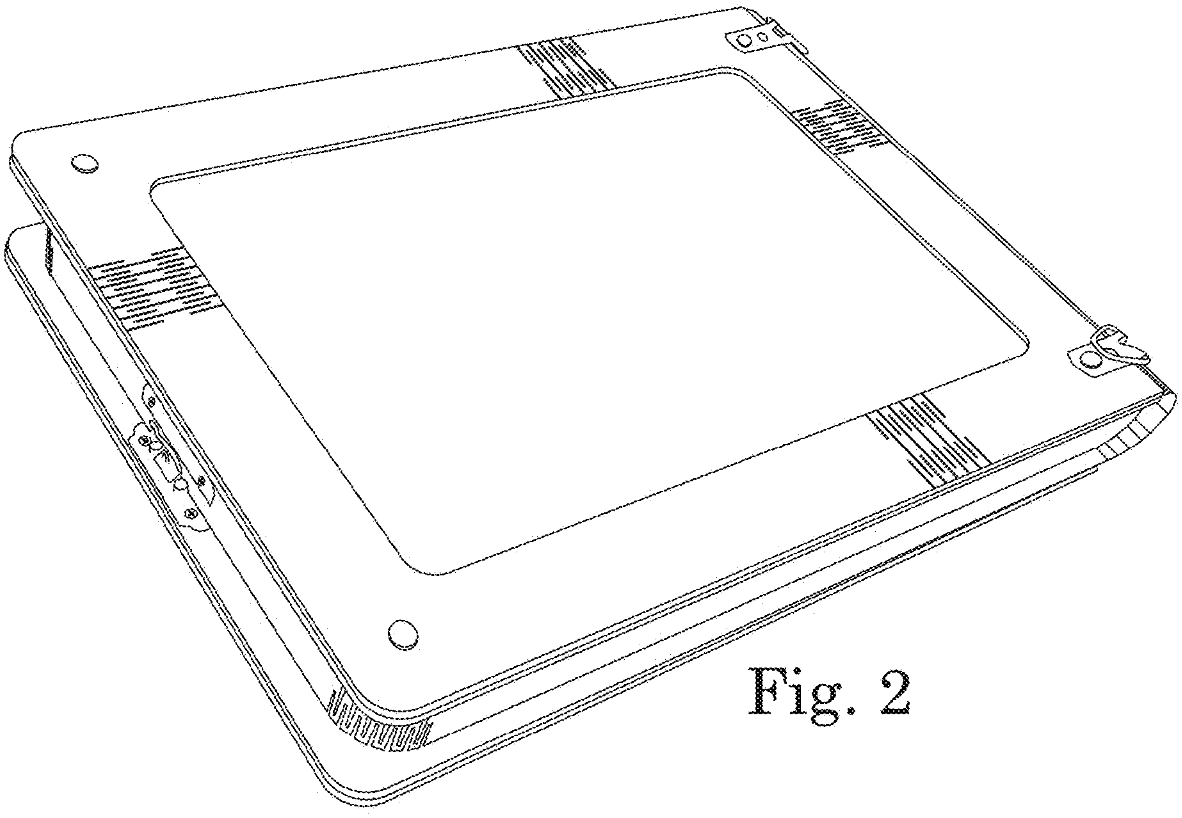
FIG. 2 shows a perspective view of the album of FIG. 1, showing the rear exterior of the closed album.
Figure 3:
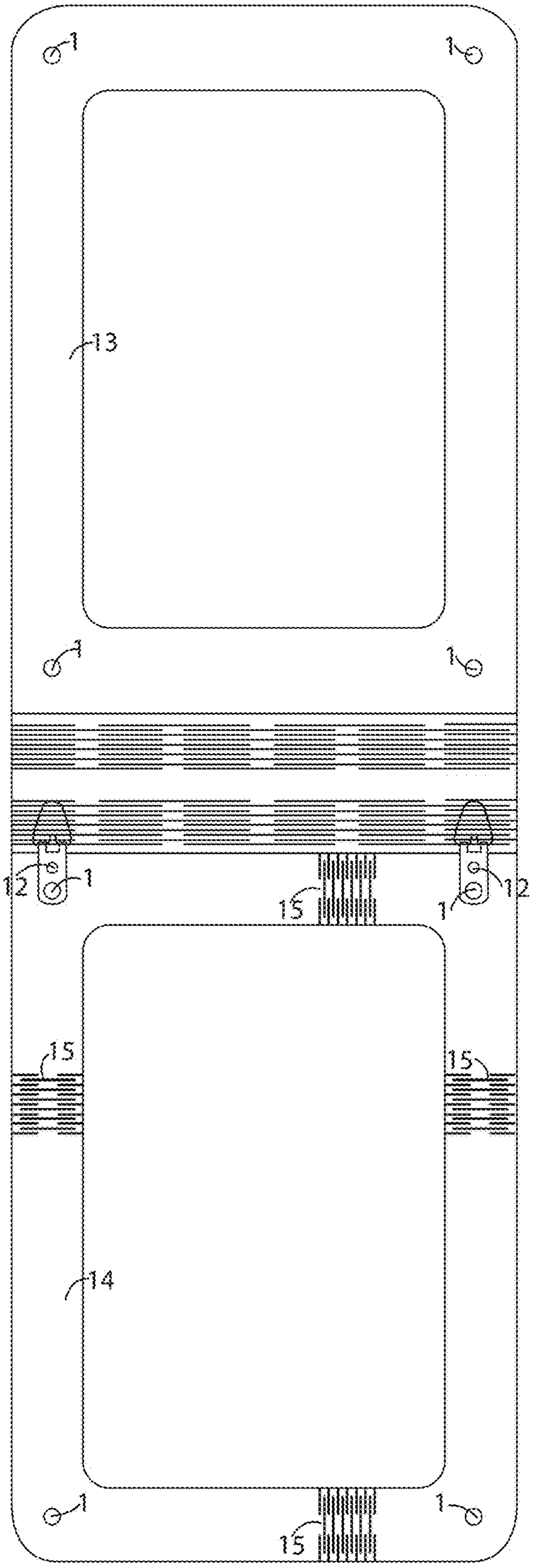
FIG. 3 presents an exterior view of an open album.
Figure 4:
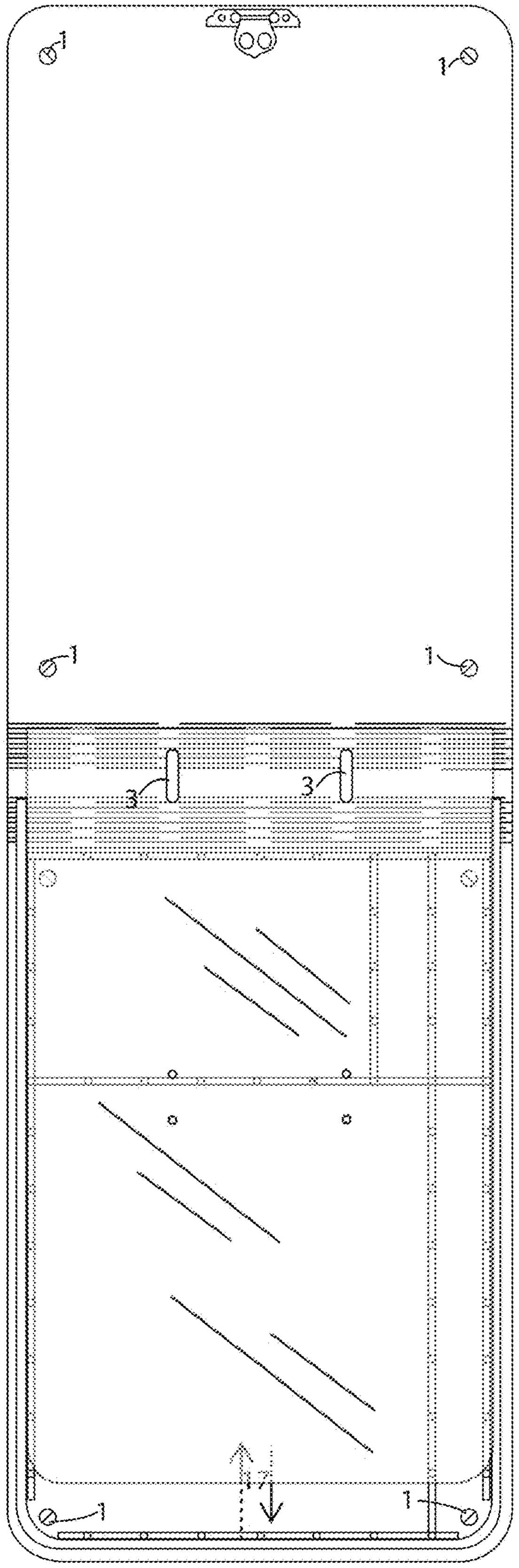
FIG. 4 shows an interior view of an open album.
Figure 5:
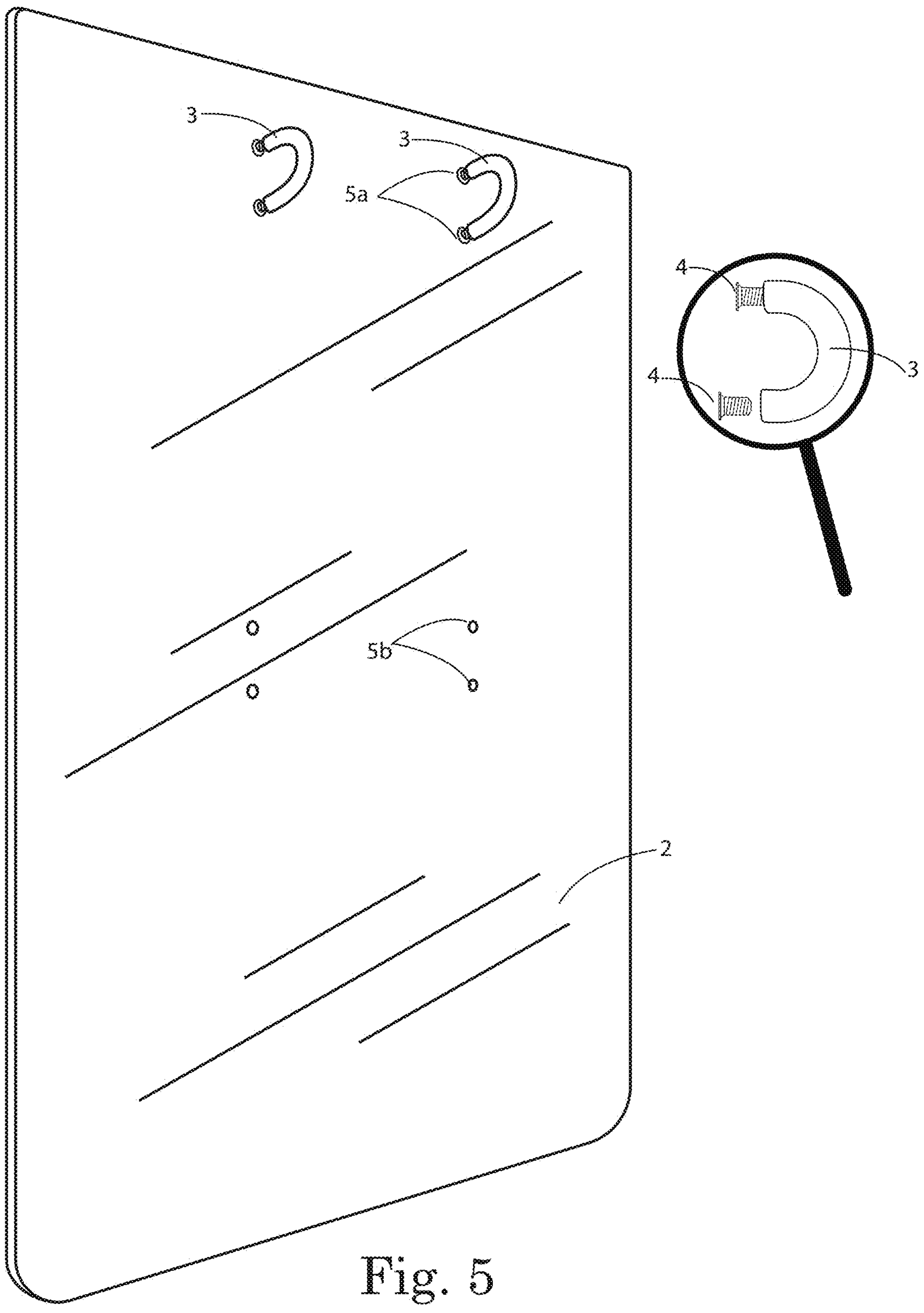
FIG. 5 presents the sliding base of the album together with the screwed support rings D.

The album is reposed on the transparent (plexiglass) drawer frame (17), FIG. 4, which is the lid of the storage space and allows the visibility of the souvenirs it contains either due to the transparent material or due to the knitting cuts of the design, so that the storage space functions as a showcase for the objects. The lid has special D-shaped screw rings (3), FIG. 5, with countersunk flat head screws (4) so that they can be moved to corresponding holes (5_a_, 5_b_) formed in suitable parts of the frame. The rings (3) also provide a solution to the easy addition and removal of the printed material and unlike the usual standard bindings, they provide flexibility and adaptability. This frame (17), which is the base for supporting the photographs, is slidably placed, in the groove (11) above the space of the display case.

In the drawer base there are ready-made holes at key points for adding pages of different standard dimensions with corresponding movement of the screw rings (3). The aforementioned holes can alternatively be adjusted with auxiliary screws, mechanical clips or wooden retaining slats.

The polymorphic box also includes at the back an external screw frame (2) with retaining bolts (1) that functions as a stand for frames for the vertical or horizontal support of the image or text it depicts, depending on their geometry, making use of the relevant engraving and releasing the corresponding screws.

Figure 9:
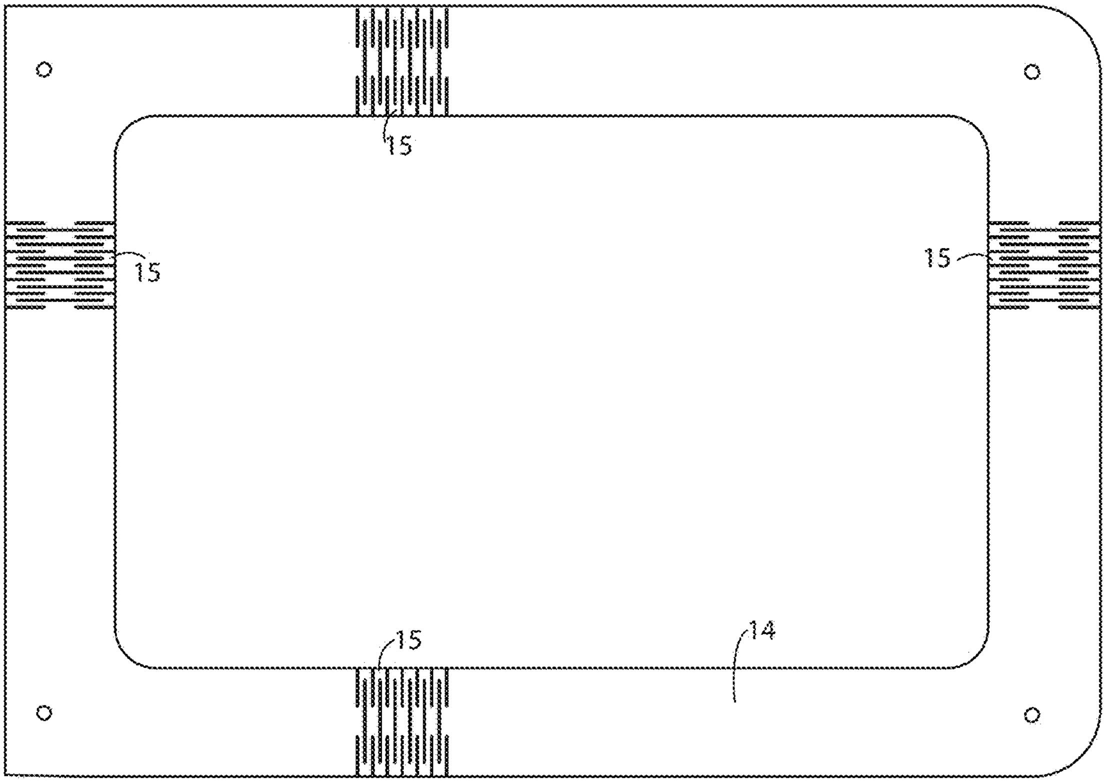
FIG. 9 shows the back cover photo support frame with the addition of the relevant engraving to function as the album support frame.
Figure 10A:
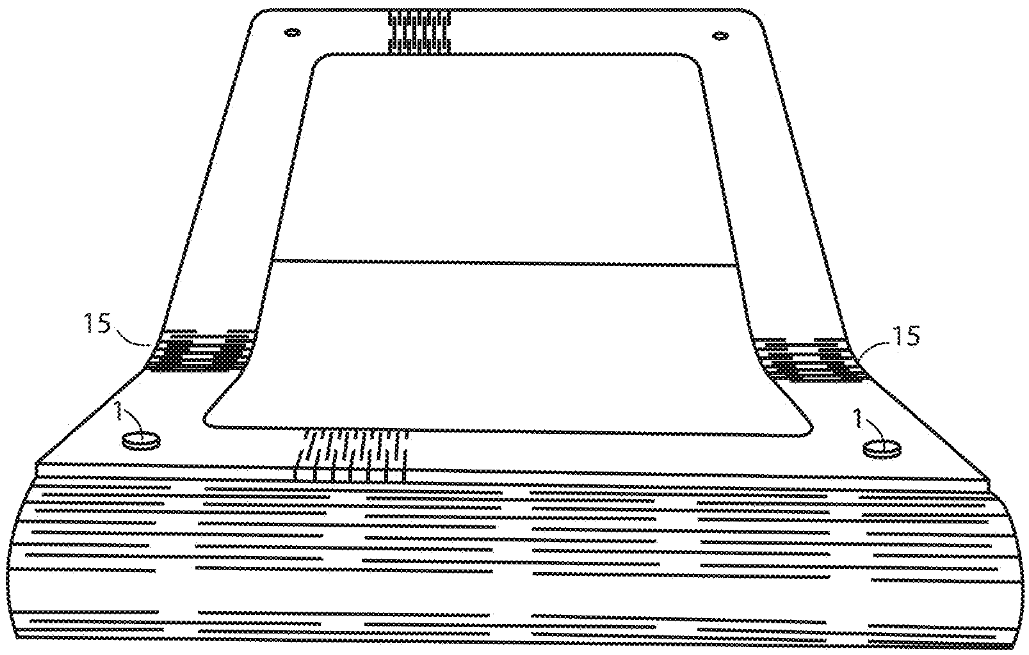
FIGS. 10A-10B present the album support frame and its appearance as a vertical and horizontal support.
Figure 10B:
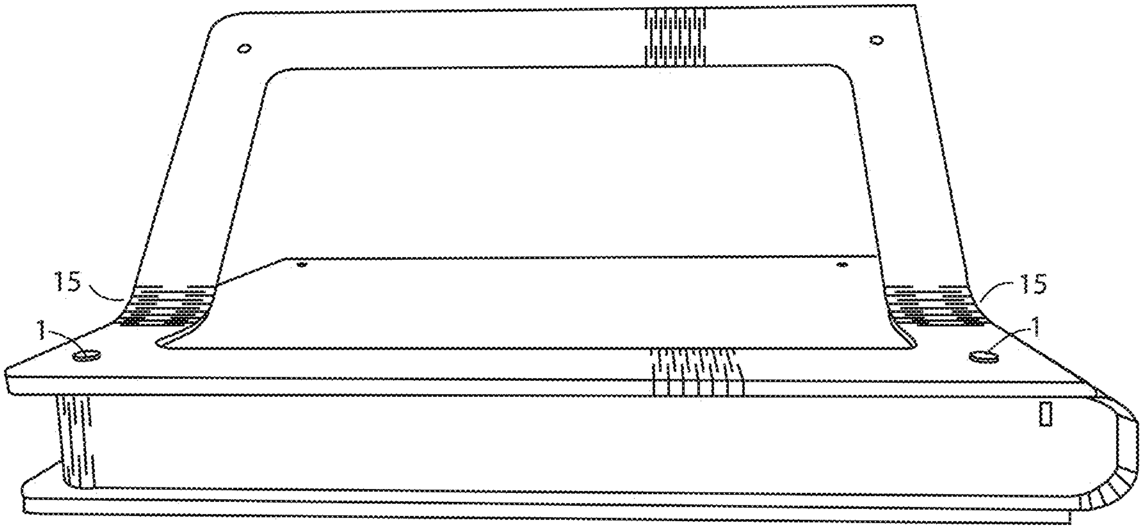
Figure 11A:
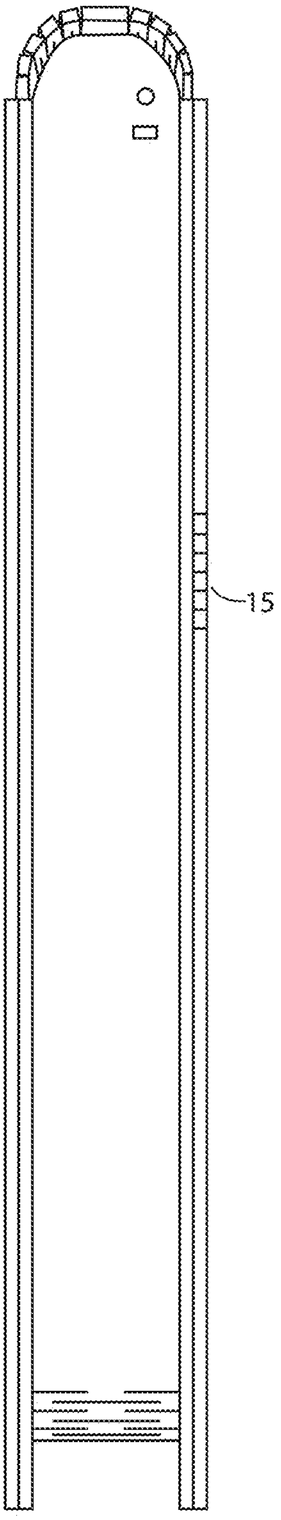
FIGS. 11A-11C present the side view of the structure showing the flexibility of the frame in terms of the degrees of support of the structure.
Figure 11B:
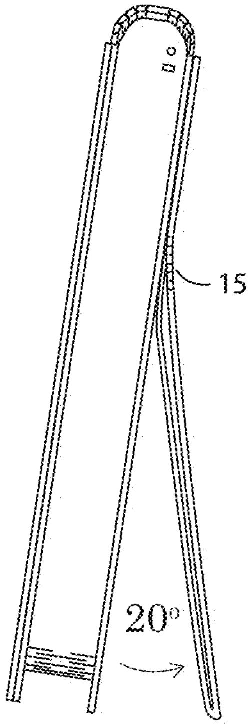
Figure 11C:
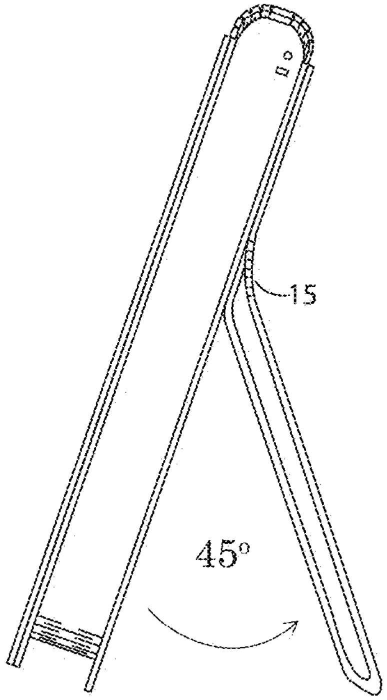
Figure 12A:
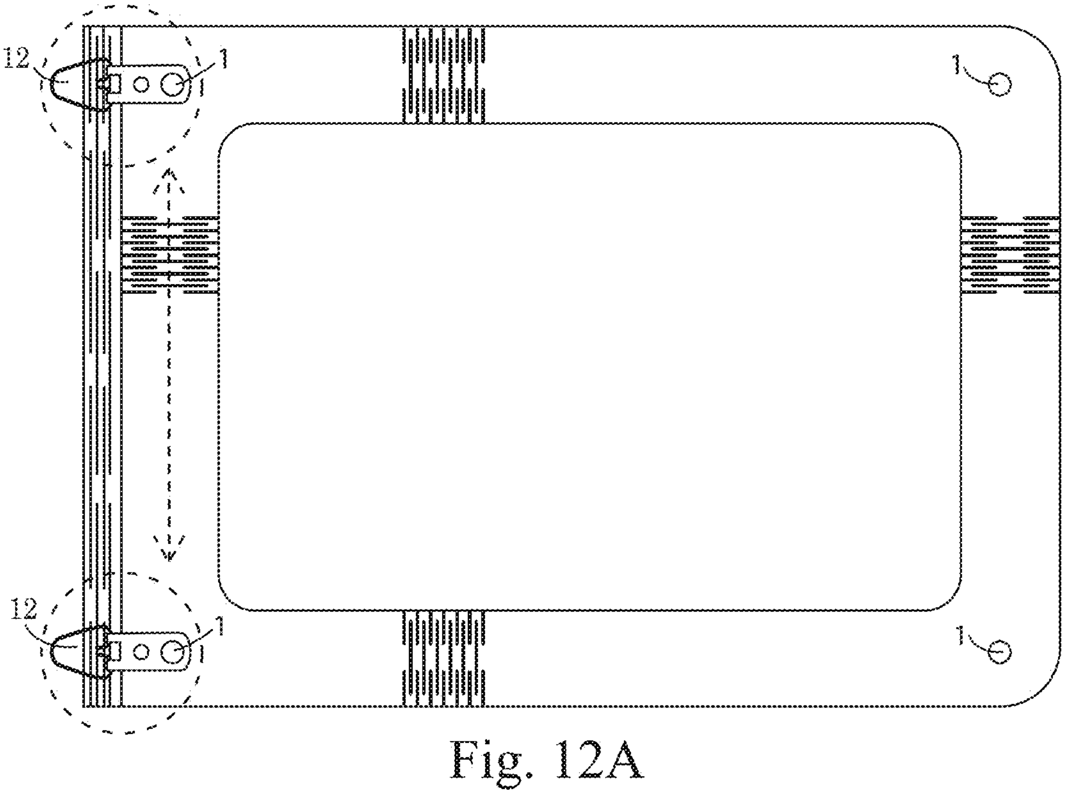
FIGS. 12A-12B show the illustration of the album support hooks and its appearance as vertical and as horizontal mounting depending on the geometry of the photograph.
Figure 12B:
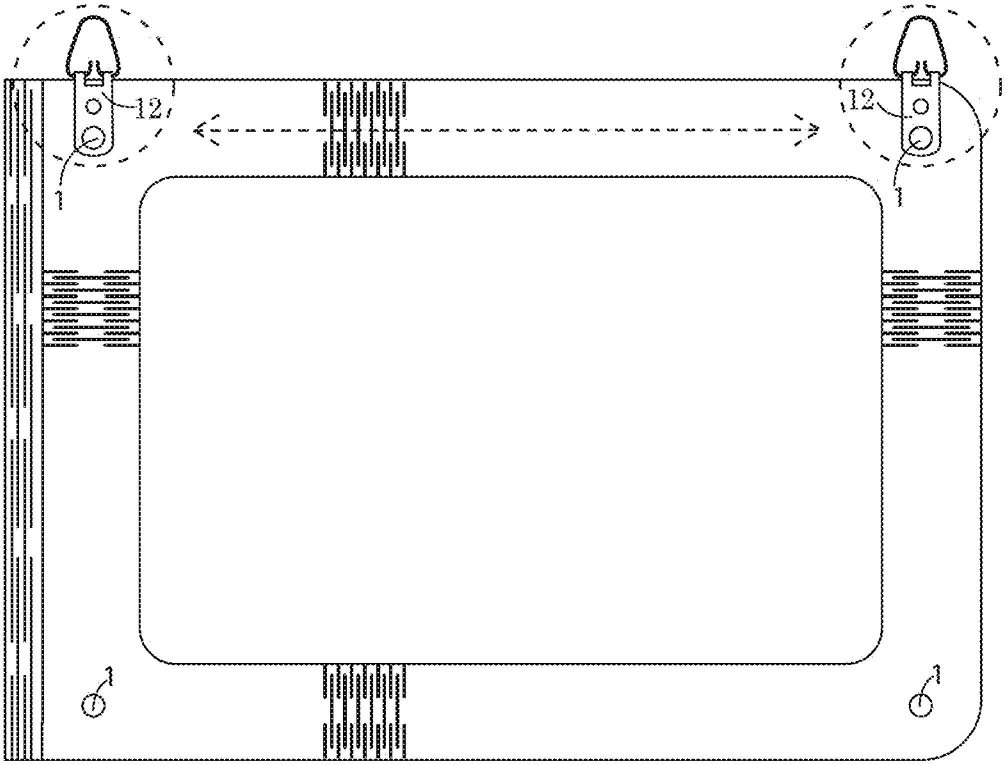
Figure 13:
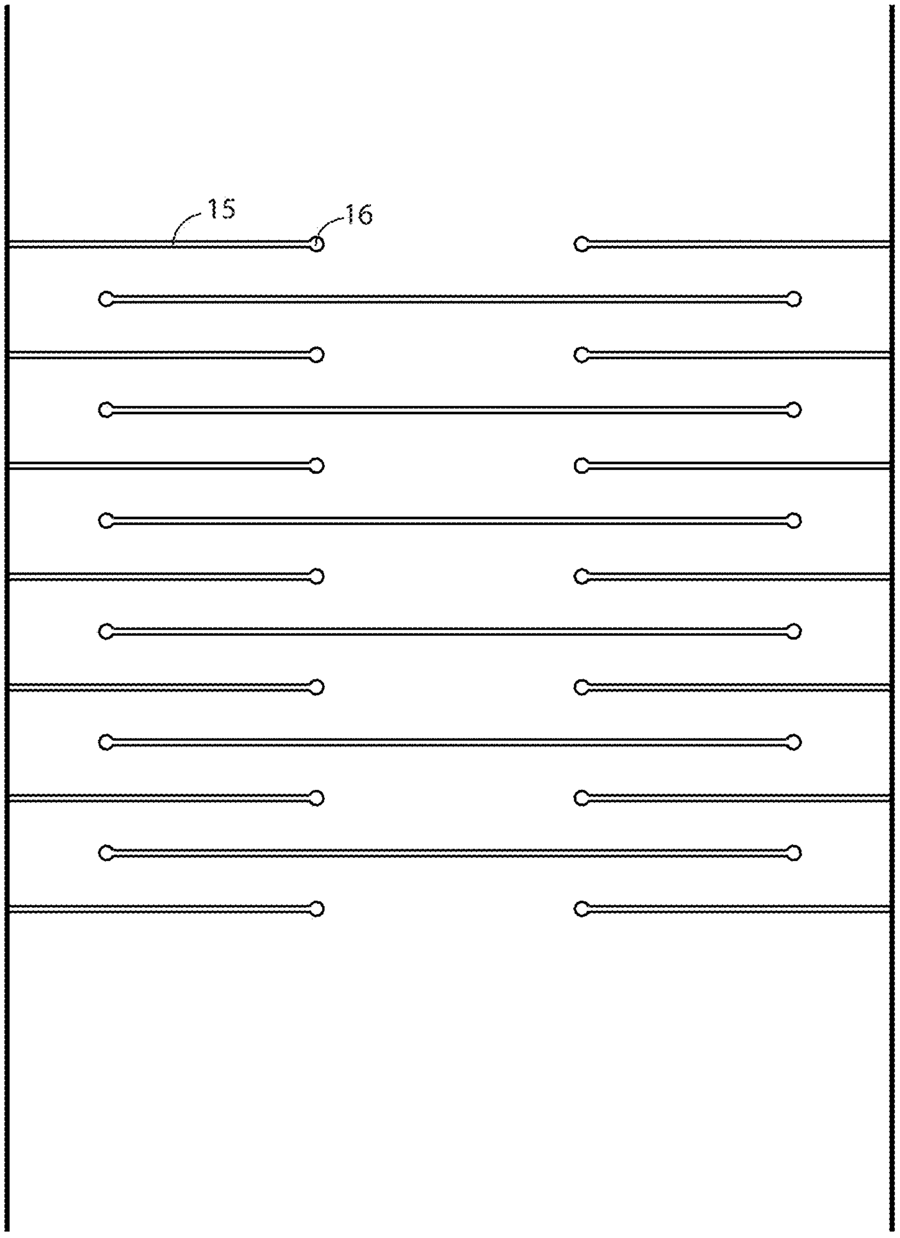
FIG. 13 presents the imprint of the curved end on the special engravings that enhance their strength.

The construction can be used as a frame with support loops (12) that can change position and adjust according to the geometry of the photograph, vertically, FIG. 12(_a_), or horizontally, FIG. 12B. Finally, the special engravings (15), FIG. 9, on the back side (14) give the construction mechanical bending and flexibility, as well as the curved ends (16), FIG. 13, enhance the durability of the polymorphic box.

Based on the above, the polymorphic box adapts to the needs of the user both in terms of its functional properties and its flexibility to adapt to them.

The present invention may be incorporated into other specific forms without departing from its structures, methods or other essential features as broadly described herein and claimed below. The embodiments described should be considered in all respects to be illustrative only and not limiting. Therefore, the scope of the invention is indicated by the appended claims and not by the preceding description.

The invention claimed is:

1. A polymorphic box, which functions simultaneously as a) a printed or digital album, b) a picture frame, and c) a frame with storage space, comprising:

a storage space with a special perimeter engraving to support vertical and horizontally formed slats; a transparent drawer frame which is a lid of the storage space and a back side of the printed or digital album and has special screw rings for easy addition, removal and rotation of printed material with recessed flat head screws so that the flat head screws can be moved to corresponding formed holes, depending on dimensions of projected material, in appropriate parts of the frame; and an external screw frame with retaining bolts with addition of loops to support the printed material vertically or horizontally, depending on geometry of an image or text the printed material depicts, so that the polymorphic box works as the picture frame.

2. The polymorphic box according to claim 1, wherein a special engraving of an outer screw frame adjusts degrees of inclination of the picture frame vertically or horizontally.

3. The polymorphic box according to claim 1, wherein a special engraving of the vertical and horizontal slats, allowing various cuts, adjusts a dimension of the storage space.

4. The polymorphic box according to claim 1, wherein the loops are of variable position.

5. The polymorphic box according to claim 1, further comprising special engravings with curved ends on a back side of the polymorphic box that not only give mechanical bending and flexibility but also increase durability of the polymorpohic box.

* * * * *